United States Patent [19]
Jiewertz et al.

[11] Patent Number: 5,214,919
[45] Date of Patent: Jun. 1, 1993

[54] ARRANGEMENT FOR REGULATING THE RESPONSE OF AN INTERNAL COMBUSTION ENGINE WITH A TURBO CHARGER

[75] Inventors: Sten Jiewertz, Järna; Mats Eriksson, Stockholm, both of Sweden

[73] Assignee: Saab Automobile Aktiegbolag, Sweden

[21] Appl. No.: 859,420

[22] PCT Filed: Nov. 22, 1990

[86] PCT No.: PCT/SE90/00758

§ 371 Date: May 26, 1992

§ 102(e) Date: May 26, 1992

[87] PCT Pub. No.: WO91/08389

PCT Pub. Date: Jun. 13, 1991

[30] Foreign Application Priority Data

Nov. 24, 1989 [SE] Sweden .................. 8903965

[51] Int. Cl.$^5$ ........................... F02B 37/12
[52] U.S. Cl. ........................... 60/602
[58] Field of Search ..................... 60/600–603, 60/611; 123/564

[56] References Cited
FOREIGN PATENT DOCUMENTS 0198312 10/1986 European Pat. Off. .
206615 11/1984 Japan .................. 60/602
75733 4/1985 Japan .
152925 7/1986 Japan .
107232 5/1987 Japan .................. 60/602
29027 2/1988 Japan .................. 60/602
246417 10/1988 Japan .................. 60/602
2105878 3/1983 United Kingdom .

Primary Examiner—Michael Koczo
Attorney, Agent, or Firm—Ostrolenk, Faber, Gerb & Soffen

[57] ABSTRACT

In order to be able to modify in a simple manner the response of a supercharged internal combustion engine as a function of the engine load, an arrangement is proposed in which the driver may regulate the charge air pressure build-up by means of a manual setting control. The manual setting control is connected to an electronic control unit which, as a function of detected engine parameters, controls the supercharging pressure with respect to desired values stored in the control unit. As a function of the adjusted position of the setting control, a reduction of the charge air pressure which is dependent on the engine load is effected. In this way, the driver can choose which response the engine will have for partial load ranges, where it is possible either to have full charge air pressure at all throttle positions or a gradual increase of the charge air pressure on increasing throttle opening.

10 Claims, 3 Drawing Sheets

ARRANGEMENT FOR REGULATING THE RESPONSE OF AN INTERNAL COMBUSTION ENGINE WITH A TURBO CHARGER

The invention relates to an arrangement for regulating the charge air pressure in an internal combustion engine having a turbo-charger.

PRIOR ART

For regulating the charge air pressure in the internal combustion engine of a vehicle, it is already known to use manual controls which, upon actuation by the driver, provide different degrees of regulation of the charge air pressure received from the compressor.

In turbo systems with a compressor arranged in the intake system of the engine and driven by a turbine arranged in the exhaust gas system of the engine and driven by exhaust gas, the charge air pressure can be regulated by a valve which is arranged in a bypass line bypassing the turbine and which regulates the exhaust gas flow through the bypass line and thus the turbine. This valve can be controlled directly by the engine intake pressure in such a way that, when the charge air pressure exceeds a certain value, the valve opens, whereupon the increase in the charge air pressure is reduced.

German patent application DE-A-2,362,133 shows such a system in which it is possible manually to increase the charge air pressure level at which the bypass valve opens. This results in an increase in the maximum charge air pressure and thus the torque to a higher level, which is maintained over the entire speed range and at all throttle positions. This means, however, that the engine must be dimensioned for the highest mechanical load occurring in the engine speed range and that the torque characteristic of the engine is increased uniformly over the entire speed range of the engine.

In German patent DE-C-2,928,902, the opening of the bypass channel is controlled, on the one hand, by the charge air pressure following the compressor and, on the other hand, by the pressure behind the throttle valve of the engine. The bypass valve opens here when the charge air pressure following the compressor exceeds an upper pressure level and when the pressure downstream of the throttle valve lies below a lower pressure level. In order to give a quicker response on acceleration from lower speeds when the charge air pressure has not had time to develop to a level exceeding the lower pressure level, the driver can manually cut out the effect of the pressure downstream of the throttle valve.

American patent U.S. Pat. No. 4,598,549 shows another system for manual turbo regulation in which the charge air pressure is ventilated off at selectable charge air pressure levels. By means of a change-over switch actuable by the driver, the turbo function can be regulated either in economy state or normal state where the charge air pressure is ventilated off at different levels for the respective turbo function state. This manual regulation too provides a uniform adaptation of the turbo pressure and thereby the engine torque over the entire speed range and at all throttle applications.

However, these previously known alternatives for manual regulation have had the disadvantage that the driver can only choose between different fixed supercharging levels which, for the turbo unit in question, give a similar appearance to the engine's speed-dependent torque characteristic or give a charge air regulation which is not affected by the throttle position or actual engine load.

The known regulating systems for supercharged internal combustion engines have only been able to act on the charge air pressure in a defined manner over the entire speed range or have only been active from the regulating point of view at certain speed ranges. The driver has therefore had limited possibilities of acting on the torque character of the engine as a function of the engine load.

OBJECT OF THE INVENTION

An object of the present invention is to improve, in a supercharged internal combustion engine, the possibility of regulating the response of the internal combustion engine to acceleration by means of a manually actuable regulating member which can be used to affect how the charge pressure builds up as a function of the engine load.

In an advantageous embodiment of the arrangement according to the invention, the regulating member is arranged accessible to the driver of a vehicle driven by the supercharged engine. In this way the driver can alter, during travel, how quickly the engine reaches maximum charge pressure at increasing accelerations.

In one application of the arrangement according to the invention, the driver of a vehicle with a supercharged internal combustion engine can either select a more gentle charge air pressure build-up which starts at basic charge pressure for small throttle openings and reaches full charge pressure only upon full throttle opening, or a charge air pressure build-up unrestricted by the throttle position. Using a regulating potentiometer which in its one end position gives the gentlest charge air pressure build-up and in the second end position gives a charge air pressure build-up unrestricted by the throttle position, the driver can, following the desired response, set a selectable degree of charge air pressure build-up dependent upon throttle position. With a setting for a gentler charge air pressure build-up, the engine can be regulated more easily for maintaining constant speed without considerable torque shocks at lower accelerations at partial load ranges.

Other more advanced drivers requiring a quick response at lower acceleration in partial load ranges can, by setting the control to the position for unrestricted charge air pressure build-up as a function of throttle position, quickly obtain the maximum engine torque even at partial load and small throttle openings, which gives this particular driver the desired driveability and engine response.

When driving on roads with a poor base, such as roads covered with gravel or ice, a quick downward regulation of the charge air pressure build-up can take place for partial load and/or small throttle openings so that a safer driving of the vehicle is achieved, without powerful torque shocks on acceleration changes at these partial load ranges.

Other characteristic features will emerge from the following description of an embodiment of the arrangement according to the invention. The description is given with reference to the attached figures.

DESCRIPTION OF AN EXEMPLARY EMBODIMENT

Figure 1:
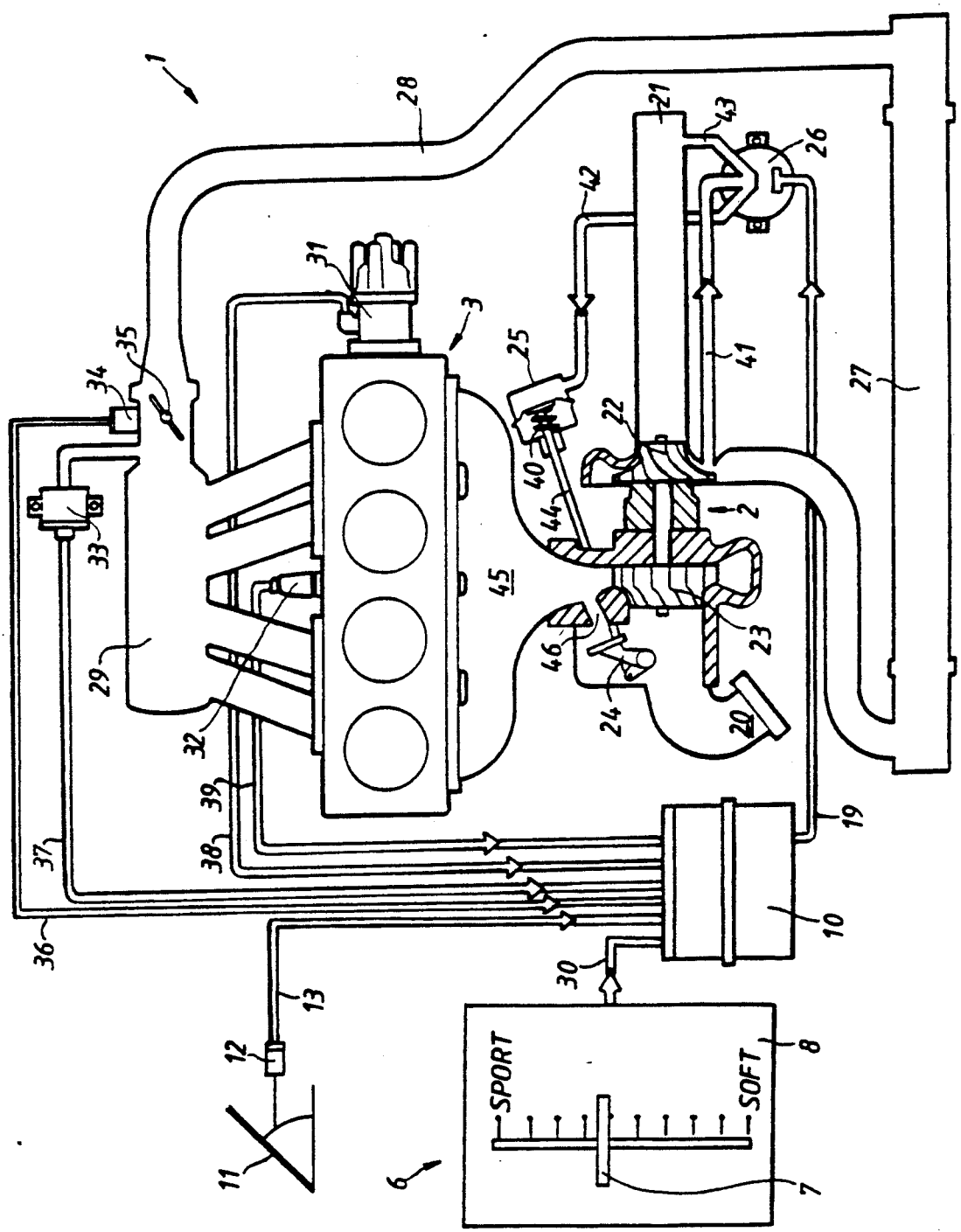
FIG. 1 shows a basic design of a turbo system according to the invention.

FIG. 1 shows a turbo system according to the invention. In contrast to a conventional aspirating engine, the supercharged internal combustion engine 3 is provided with an improved filling during the aspirating cycle by means of a supercharger 2, which gives more efficient combustion, increased power and higher torque. With the aid of the supercharger 2, a performance is obtained which is comparable to that of a larger engine, but while retaining the advantages of the smaller engine as regards fuel consumption, space requirements and weight.

The supercharging can be achieved with the aid of a supercharger of the turbo compressor type, also called a turbo, which involves the exhaust gases of the engine 3 being used as drive medium. The exhaust gases from the exhaust collector 45 are passed through an exhaust gas turbine 23 and thus cause the turbine blade wheel to rotate. The blade wheel of the turbine 23 is secured on the same shaft as a compressor blade wheel 22 and rotates at the same speed. The compressor wheel is placed in the intake system 21, 27, 28, 29 and generates there pressure increase which gives rise to improved filling in the cylinders of the internal combustion engine 3.

By designing the turbo for early operational engagement, i.e. pronounced charge air pressure build-up, even at relatively low speeds a higher torque is obtained in speed ranges which are used under normal driving conditions.

An earlier predominant adaptation of the turbo usage has been aimed at giving increased peak output, which means that it is primarily active in the upper speed range of the engine under high loads on the engine.

The charging pressure in the inlet pipe is primarily dependent on the engine speed and load. At higher load, however, the charging pressure is limited by a charging-pressure regulator 24, 25, 40, 44. The charging-pressure regulator is placed on the exhaust side of the engine and regulates, via the flap valve 24, the exhaust gas flow through a bypass channel 46 on the side of the exhaust gas turbine 23.

When the load increases and the charging pressure approaches the desired value indicated for the operating conditions, the flap valve 24 opens and allows some of the exhaust gases to pass through the bypass channel 46 directly to the exhaust gas outlet 20, the exhaust gas turbine 23 being unloaded. The flap valve 24 is acted upon by a control rod 44 from a diaphragm pot 25 placed on the supercharger unit 2. A spring 40 in the diaphragm pot 25 has the task of closing the flap 24. The diaphragm is acted upon by the compressor pressure, which is passed via a line 41 over a solenoid valve 26 and on into a line 42 to the diaphragm pot 25. The solenoid valve 26 is controlled in a conventional manner between a closed and an open position by means of an electrical control unit 10, by electrical pulse-width modulation. In the closed position, an evacuation channel 43 is closed, which means that the diaphragm pot 25 is acted upon by the full pressure following the compressor 22. The charging-pressure regulator then opens the flap valve 24 at a lower charge air pressure level, which is determined by its basic setting, with a return spring 40 designed for this purpose. In the open position, the pressure is evacuated through the evacuation channel 43 to the inlet side of the compressor. The diaphragm pot 25 of the charging-pressure regulator thus becomes pressureless and then closes the flap valve 24, which gives a maximum charge air pressure following the compressor since the entire exhaust gas flow passes the exhaust gas turbine 23, which directly drives the compressor 22.

While driving, the solenoid valve pulsates between the open and closed position at a fixed frequency, for example 12 Hz. By means of the pulse-width modulation of the control device 10, the ratio between the time the solenoid valve is open and closed during a pulse cycle is altered. The level of the charge air pressure can therefore be regulated by the control device 10 as a function of detected engine parameters. The control device 10, which consists of a conventional microprocessor with integrated memory units, receives electrical signals from a knock sensor 32 arranged on the engine block, a pressure sensor 33 arranged in the inlet pipe 29, a distributor-based speed sensor 31, a throttle position potentiometer 34 and an accelerator pedal position sensor 12 via lines 39, 37, 38, 36 and 13 respectively.

Figure 3:
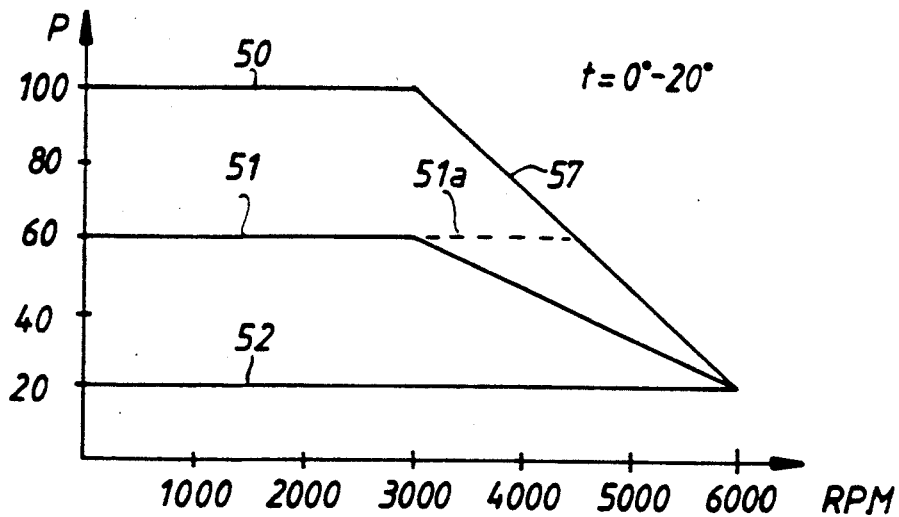
FIGS. 3-5 show how the charge air pressure can be regulated for different throttle opening angles.

As the control device 10 has stored desired values for the maximum charge air pressure for different detected engine parameters, the solenoid valve is controlled so that these desired values are not exceeded. In FIG. 3, curve 50, 57 shows a typical appearance of a rotation speed-dependent maximum charge air pressure level for a supercharged internal combustion engine. Up to a certain given rotation speed (curve part 50) there is a restriction of the charge air pressure primarily in order to ensure that the engine will not be subjected to excessively high mechanical loads. At higher speeds (curve part 57) a charge air pressure restriction starts, which is primarily intended to prevent abnormal and uncontrolled combustion, so-called knocking, from occurring in the internal combustion engine and to prevent the exhaust gases from reaching excessively high temperatures. At increasingly higher engine speeds and higher loads, an even greater part of the exhaust gas flow is thus conveyed past the exhaust gas turbine 23 by means of the fact that the desired values for the charge air pressure stored in the control unit are reduced on rising engine speed and/or load.

A regulation of the charge pressure of the supercharging unit, in which only one reduction of the charge pressure takes place to obtain a margin against knocking occurring in the internal combustion engine, often gives rise to an engine which is difficult to handle and which, in the event of small changes of the accelerator, causes great changes in torque.

A method for making the internal combustion engine more easily regulated may, for example, comprise the engine load level also being detected, the latter being given by the throttle position 35 or the accelerator pedal position 11. On acceleration at low engine loads, the charge air pressure is restricted relative to an engine not regulated according to the invention more than is justified by a restriction taking into account, for example, the mechanical load of the engine or the risk of knocking. An engine load-dependent restriction of the charge air pressure makes the internal combustion engine more easily regulated on holding constant speed at partial load corresponding to smaller throttle openings and acceleration, and therefore increases the driveability for the average driver despite the fact that the latter still has access to higher charge pressures at greater acceleration. In order to increase the driveability in this way and to make the engine more easily regulated on holding constant speed at partial load, the control unit 10 can also take account of the engine load via the detected throttle position or accelerator pedal position by means of a throttle potentiometer 34 or accelerator pedal position sensor 12. For these partial load ranges, the control unit can comprise stored reduction factors for the charge air pressure, which reduce the charge air pressure in inverse proportion to the decreasing throttle opening. This means that small acceleration changes at a small engine load do not result in greatly altered engine torque. A consequence of this is, however, that the feeling of quick response which is typical of the turbo engine on small changes in acceleration at partial load ranges is lost. Such a measure means that the turbo unit is functionally disconnected at partial load so that the engine is instead more easily regulated by the driver or a cruise control and therefore appears less "jumpy".

By virtue of the fact that the control unit also senses knocking by means of the knocking sensor 32, the desired values stored in the control unit can be reduced in order for the knocking state to be eliminated. The reduction can be carried out in steps until the knocking state has been cancelled, which means that these desired values are optimised for the fuel quality and individual engine in question. The reduction factors can of course instead be stored in table format in the control unit 10 with reduced desired values for the charge air pressure. A knock-eliminating system of this type is described in greater detail in patent SE-B-427,861.

According to the invention, the control unit 10 also receives a manually adjustable engine load-dependent charge air pressure reduction by means of a manual setting member 6 connected to the control unit 10 via line 30. The setting member 6 comprises a control 7 by means of which the driver can at least cut out the charge air pressure reduction dependent on the engine load.

Figure 4:
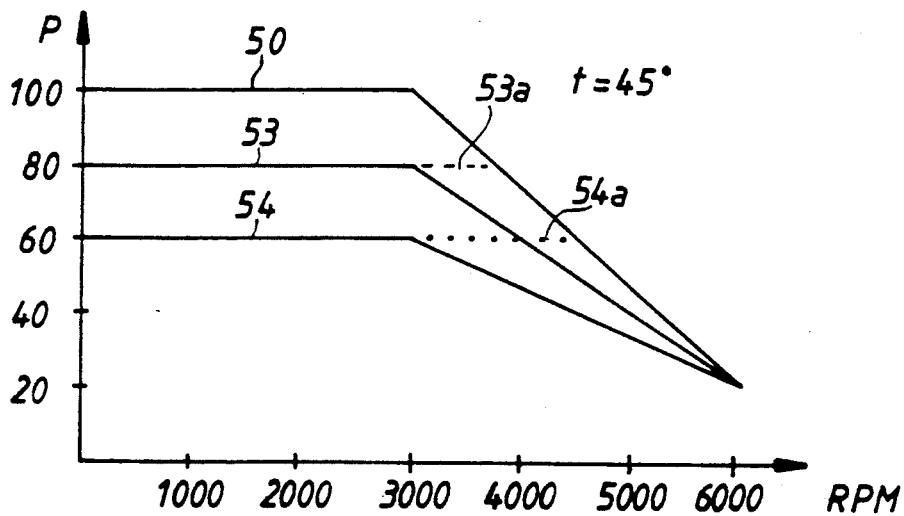
Figure 5:
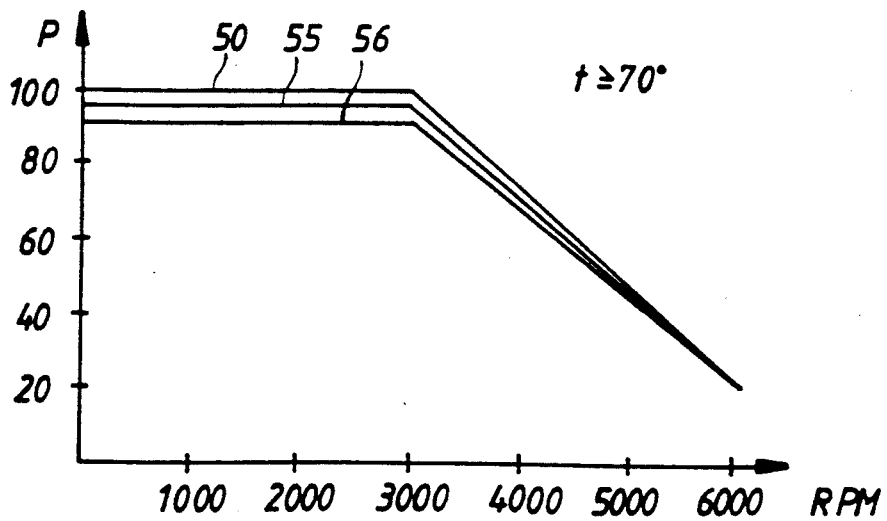

FIGS. 3-5 show how the charge air pressure reduction can be affected at different throttle opening angles. In these figures, curve 50 (in FIG. 3 curve 50, 57) corresponds to the normal regulation effected in order to ensure that the engine will not become mechanically overloaded or risk passing into a knocking state. With the manual setting control 7 set at one end position, which can be referred to, for example, as sport position, in which the throttle position dependence is completely cut out, a maximum charge pressure level is obtained corresponding to curve 50 in FIGS. 3-5 for all throttle positions. In this way, the engine can quickly reach maximum charge air pressure even at small accelerations, both in partial load ranges and full load ranges. The engine is then given a sporty character which means that the engine quickly responds to acceleration, which can be desirable in certain driving situations. If the setting control 6 is instead set at a second end position, which can be referred to, for example, as soft position, in which a throttle position-dependent reduction is fully utilised, the maximum charge pressure is restricted to a level corresponding to curves 52, 54 and 56 in FIGS. 3-5 for throttle openings of 0° to, respectively, 20°, 45° and greater than or equal to 70°. In this way the engine response is limited at small throttle openings and low load so that, at small throttle openings corresponding to the low load range of the engine, an engine torque character is obtained corresponding almost to an aspirating engine or an engine torque character or supercharging degree corresponding to a basic charge pressure of the supercharging unit 2. The charge pressure restriction is carried out in such a way that a first reduced charge pressure level constitutes a maximum desired value for a throttle angle range, advantageously between 0° and 20° corresponding to the low load range, within which range the major part of the engine regulation is undertaken for holding constant speed at so-called road load. At a throttle angle where the engine reaches almost full load and at exceeding throttle angles, the desired charge pressure level value of the charge pressure level which is restrictive with respect to mechanical loads and knocking risks is advantageously formed. Intermediate desired values for the charge pressure and for respective throttle positions are obtained by interpolation between indicated desired values, for example for the low load range and the full load range. With at least one intermediate throttle position and with the desired value formation controlled and indicated by other desired values, the progressiveness of the desired value can be controlled. With increasing throttle opening, the charge pressure restriction thus decreases gradually and, at full throttle opening, finally disappears completely, i.e. maximum charge air pressure is obtained. The engine can then be more easily regulated at partial load ranges without any great engine torque alteration developing on acceleration changes, and at the same time the driver has access to maximum engine torque at full load.

In the preferred embodiment of the invention, the setting control 7 can be adjusted steplessly between said end positions. The setting control can advantageously consist of a slide or turn potentiometer which gives, via signal line 30, a signal level dependent on the position of the potentiometer. The control unit 10 detects the signal level and gives, corresponding to the signal level, a throttle position-dependent degree of reduction of the charge air pressure. By means of this embodiment of the setting control 7, the driver can adjust by degrees the charge pressure reduction dependent on the throttle position.

FIG. 3 shows the charge pressure range which can be set between curves 50, 52 as a function of the engine speed at throttle angles between 0° and 20°. In the case of a proportional regulating function, a charge pressure-restricting level can be set in an intermediate position 51 between maximum charge pressure 50 and basic charge pressure 52 by adjusting the setting control 7 to a corresponding intermediate position.

The charge pressure restriction may optionally be constant and follow the broken curve part 51a in FIG. 3 or the broken curve parts 53a and 54a in FIG. 4, until an engine speed is obtained where the charge pressure level reduced with regard to the knocking risk (curve 57) falls below the manually set constant charge pressure level. However, this means that a manually set charge pressure reduction decreases at increasing speed.

For a corresponding intermediate position of the setting control 7, curve 53 in FIG. 4 shows a charge pressure reduction corresponding to curve 51 in FIG. 3 for a 45° throttle position, and curve 55 in FIG. 5 for throttle positions over 70°. In FIG. 5, the curves are separated for reasons of clarity, but they can coincide when full load is defined as throttle position 70° or more. In order for a proportional regulation of the charge pressure to be obtained over the speed range of the engine, in the preferred embodiment the charge air pressure is restricted to the set position of the setting control 7 in accordance with the full-line curves 51-56.

In an alternative embodiment, the charge pressure reduction can be coupled in in at least two distinct positions using a multi-position switch. For example, a throttle position-independent charge pressure reduction according to curve 50 can be obtained in one position, and a throttle position-dependent charge pressure reduction according to curves 52, 54 and 56 can be obtained in a second position. If appropriate, the control unit can also detect the speed of the acceleration and temporarily increase the manually set desired value for the charge pressure if the acceleration change is rapid.

Figure 2:
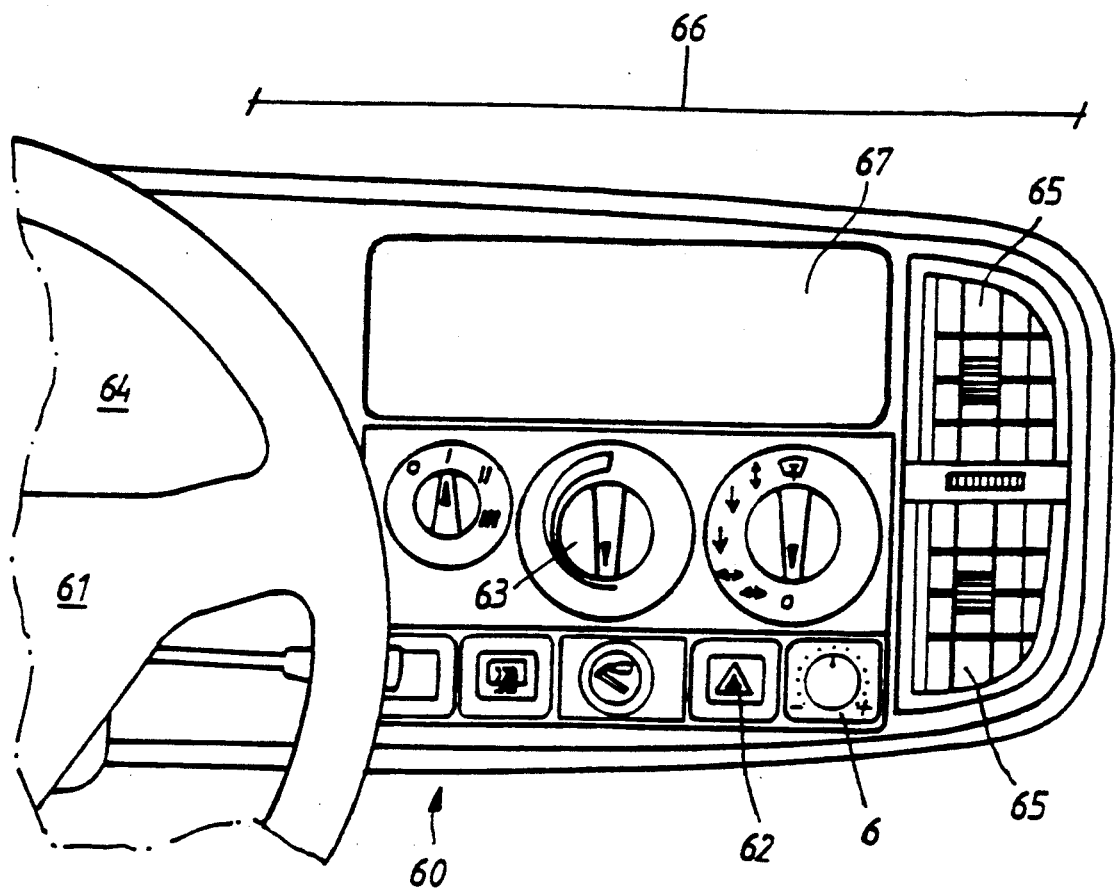
FIG. 2 shows a second alternative of the response control mounted in the instrument panel of a motor vehicle.

FIG. 2 shows an alternative embodiment of the setting member 6 integrated in an instrument panel 60 at the driver's seat in a vehicle. The setting member 6 is advantageously arranged in a secondary zone 66 to the side of the wheel 61 in an assembly recess intended for manoeuvring controls. In the secondary zone 66 there are a number of other manoeuvring controls, such as ventilation controls 63, 65 and electrical function switches 62, which the driver can reach from the driver's seat. Arranged in a conventional manner in the primary zone 64 of the instrument panel 62 are the instruments essential for monitoring the vehicle. The setting control itself in this case consists of a turn potentiometer which can regulate the turbo response between an end position marked — and an end position marked +.

A number of other variants of the setting control 7 can be designed within the scope of the invention. Instead of potentiometers, different stepped control functions can be activated by means of push buttons or rocking commutators, which affect the degree of charge pressure reduction in steps upon actuation of the switch or commutator.

The setting control can also consist of one or more code pins (not shown) arranged in or in connection with the control unit 10. These code pins can be given, by means of mechanical or electrical switching, a positive, grounded or unconnected electrical voltage level. The signal level of the code pin or code pins thus forms a code for a program which is stored in the control unit and which gives different degrees of throttle position-dependent reduction for different codes. This solution too allows the throttle position-dependent reduction to be modified simply by means of a manual operation or coupling-in of the pin at different electrical voltage levels.

Although the exemplary embodiment relates to a turbo compressor 2, the invention is not limited to this type of supercharging unit. In screw compressors driven by rotatint engine shafts, the engine load-dependent supercharging level is affected in the same way with a manual setting member, but instead of regulation of a wastegate valve, the inlet slide of the screw compressor is regulated. This manual setting member can in a similar way affect the regulating procedure typical for each supercharging unit.

The above description of an exemplary embodiment of the arrangement according to the invention should not be regarded as limiting the inventive concept as set out in the patent claims. The invention can be modified in a number of embodiments, of which only some have been touched upon in the description. The manual regulation of the charge air pressure can of course also act directly or indirectly on the ignition system and fuel system functioning so that these systems, together with the main charge pressure regulation, obtain optimal functioning.

We claim:

1. Arrangement for regulating the charge air pressure in an internal combustion engine supercharged by means of a charge air unit, comprising:

a regulating member for regulating the supercharging pressure of the charge air unit;

a plurality of sensors for sensing different engine parameters, including at least one engine-load sensor for sensing the load of the engine;

electrical control means for applying control signals to the regulating member to regulate the charge air pressure, the control means being coupled to the sensors for receiving input signals therefrom and having a memory unit containing stored values for the desired charge air pressure as a function of the input signals supplied by the sensors; and manually adjustable means coupled to the control means for supplying a charge air pressure reduction signal thereto, the control means reducing the value for the desired charge air pressure so that the value for the desired charge air pressure is reduced in response to decreasing instantaneous engine load as sensed by the engine load sensor, the degree of reduction being given by the charge reduction signal from the manually adjustable means.

2. Arrangement according to claim 1, wherein the engine load sensor comprises a throttle position sensor.

3. Arrangement according to claim 1, wherein the engine load sensor comprises an accelerator pedal position sensor.

4. Arrangement according to claim 1, wherein the manually adjustable means permits a manual adjustment of the degree of charge reduction between at least two reduction levels.

5. Arrangement according to claim 4, wherein at one reduction level the degree of charge pressure reduction is essentially negligible.

6. Arrangement according to claim 4, wherein the manually adjustable means provides essentially steplessly adjustment to intermediate positions between said at least two positions.

7. Arrangement according to claim 6, wherein the manually adjustable means comprises a slide potentiometer.

8. Arrangement according to claim 6, wherein the manually adjustable means comprises a turn potentiometer.

9. Arrangement according to claim 6, wherein the charge reduction signal from the manually adjustable means is proportional to the position of the manually adjustable means and the degree of reduction is proportional to said charge reduction signal.

10. Arrangement according to claim 6, wherein the manually adjustable means is arranged on the instrument panel of a vehicle drive by the supercharged engine, and is accessible for manual adjustment by the driver.

* * * * *